United States Patent
Hasebe

(10) Patent No.: US 12,277,705 B2
(45) Date of Patent: Apr. 15, 2025

(54) IMAGE PROCESSING METHOD AND RECORDING MEDIUM

(71) Applicant: SCREEN HOLDINGS CO., LTD., Kyoto (JP)

(72) Inventor: Ryo Hasebe, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 366 days.

(21) Appl. No.: 17/884,161

(22) Filed: Aug. 9, 2022

(65) Prior Publication Data

US 2023/0063443 A1    Mar. 2, 2023

(30) Foreign Application Priority Data

Sep. 1, 2021   (JP) .................... 2021-142423

(51) Int. Cl.
  *G06K 9/00*    (2022.01)
  *G06T 7/00*    (2017.01)
  *G06T 7/11*    (2017.01)

(52) U.S. Cl.
  CPC .............. *G06T 7/0012* (2013.01); *G06T 7/11* (2017.01); *G06T 2200/04* (2013.01); *G06T 2207/10101* (2013.01); *G06T 2207/20152* (2013.01); *G06T 2207/30044* (2013.01)

(58) Field of Classification Search
  CPC ............ G06T 2207/30024; G06T 2207/30044
  See application file for complete search history.

(56) References Cited

U.S. PATENT DOCUMENTS

| | | | |
|---|---|---|---|
| 2017/0140535 A1 | 5/2017 | Hamamah et al. | |
| 2018/0112182 A1* | 4/2018 | Zon ....................... | A61K 38/28 |
| 2019/0225923 A1* | 7/2019 | Ang ...................... | H04N 23/695 |
| 2021/0056704 A1 | 2/2021 | Kuromi et al. | |
| 2022/0189019 A1* | 6/2022 | Wessels Wells ....... | G16H 50/30 |
| 2023/0061181 A1* | 3/2023 | Hasebe ................. | G06T 7/0012 |

FOREIGN PATENT DOCUMENTS

EP    3 748 580 A1    12/2020

OTHER PUBLICATIONS

Extended European Search Report issued in corresponding European Patent Application No. 22188034.7-1210, dated Jan. 26, 2023.

* cited by examiner

*Primary Examiner* — Hadi Akhavannik
(74) *Attorney, Agent, or Firm* — Rimon P.C.

(57) ABSTRACT

An image processing method according to the invention comprises: obtaining three-dimensional image data representing a three-dimensional image of a fertilized egg in a cleavage stage obtained by imaging the fertilized egg by optical coherence tomography; extracting a blastomere region corresponding to an individual blastomere in the three-dimensional image for each blastomere based on the three-dimensional image data; counting a number of the blastomere region extracted in the three-dimensional image; obtaining a volume of each blastomere region based on the three-dimensional image data; and determining a number X of the extracted blastomere regions is expressed by a following inequality:

$$2^N < X < 2^{N+1} \text{ (N is a natural number)}$$

and when the inequality holds, dividing each of $(2^{N+1}-X)$ blastomere regions having a largest volume out of the X blastomere regions equally into two blastomere regions.

5 Claims, 9 Drawing Sheets

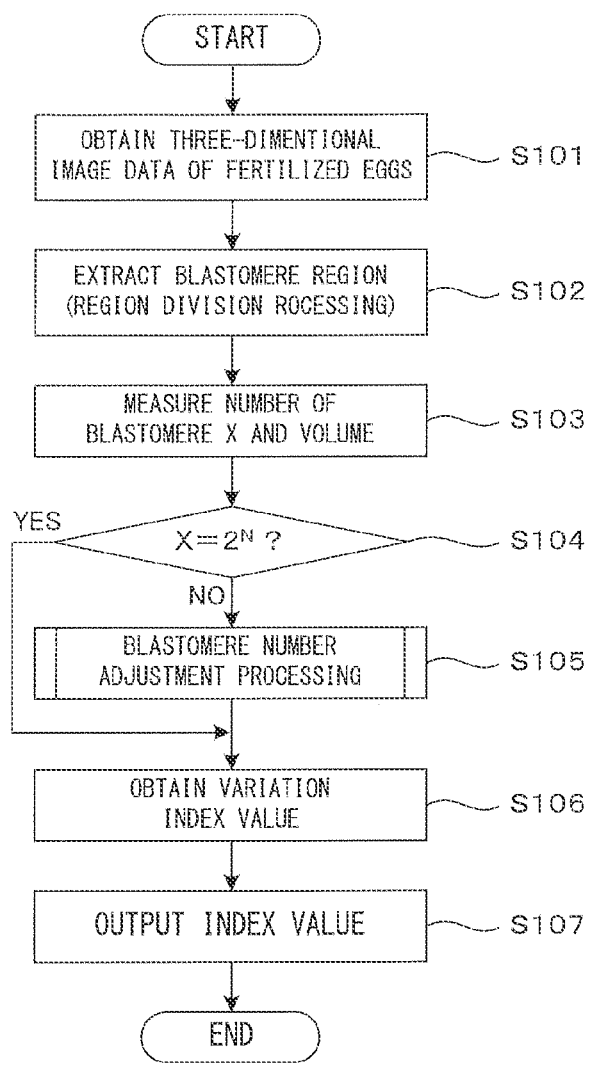

FIG. 4

| CASE | NUMBER OF BLASTOMERE X | PATTERN |
|---|---|---|
| (a) | 1 / 2 / 4 / 8 / ⋮ | |
| (b) | 3 | |
| (c) | 5 | |
| (d) | 6 | |
| (e) | 7 | |

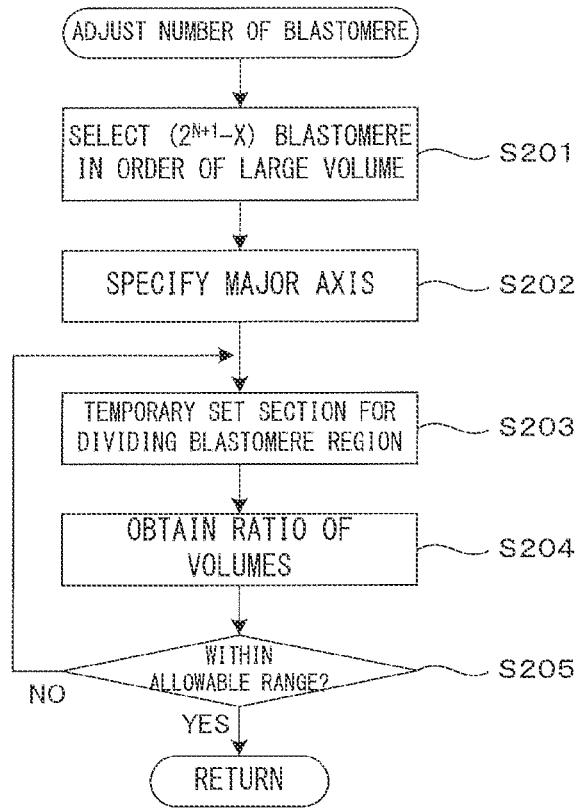

IMAGE PROCESSING METHOD AND RECORDING MEDIUM

CROSS REFERENCE TO RELATED APPLICATION

The disclosure of Japanese Patent Application No. 2021-142423 filed on Sep. 1, 2021 including specification, drawings and claims is incorporated herein by reference in its entirety.

BACKGROUND OF THE INVENTION

1. Field of the Invention

This invention relates to an image processing suitable for imaging a fertilized egg (embryo), particularly a fertilized egg in a cleavage stage, and evaluating a state of the fertilized egg.

2. Description of the Related Art

For example, in an assisted reproductive technology aimed at an infertility treatment, an embryo (fertilized egg) fertilized in vitro and cultured for a certain period is returned to a body. However, a pregnancy success rate (in the assisted reproductive technology) is not necessarily high and patient's mental and economic burdens are large. To solve this problem, a method for precisely judging a state of an embryo being cultured is sought for.

For example, Veeck's classification is known as general evaluation criteria in an early stage of embryogenesis until a fertilized egg grows to a morula. This serves as a guideline in classifying a state of a fertilized egg in multiple stages based on the number and size uniformity of blastomeres formed by cleavage and a rate of fragmentation.

Conventionally, a state of a fertilized egg has been observed/evaluated, using a device called a time-lapse incubator. For example, the fertilized egg is regularly imaged by a microscope while being placed in a culture environment. However, since optical microscope imaging is for imaging the fertilized egg from one gaze direction, it cannot be said to be sufficient to precisely represent a three-dimensional structure of the fertilized egg. Thus, criteria such as Veeck's classification described above are available for the evaluation of a fertilized egg, but this evaluation is finally left to subjective judgment by a trained specialist such as a qualified person at present.

Thus, a technique is desired which can quantitatively and objectively make such an evaluation. It is being studied as a technique expected to meet such a request that a three-dimensional image of an embryo (fertilized egg) imaged by a noninvasive tomographic imaging technique such as optical coherence tomography (OCT) is analyzed to obtain quantitative information of the three-dimensional image. For example, US2021/0056704A (patent literature 1) previously disclosed by the applicant of this application describes a technique for dividing a three-dimensional image of an embryo obtained by OCT imaging into a plurality of regions according to a structure of the three-dimensional image. By utilizing this technique, it is expected to be possible to individually extract blastomeres and fragmentations, for example, from an embryo in a cleavage stage.

In a cleavage process, the number of cells gradually increases by repeating a process of dividing one cell into two and, subsequently, dividing each divided cell into two. Accordingly, the number of the cells generally increases 1, 2, 4, 8, . . . , by two each time according to a geometric progression with a first term of 1 and a common ratio of 2. However, since each cell is not strictly simultaneously divided, there is possibly a timing at which a number of cells, which do not transiently follow this progression, are present. In a fertilized egg at this time, blastomeres immediately after cleavage and blastomeres immediately before cleavage are mixed.

An image to be analyzed is a stationary image obtained by imaging the fertilized egg at a certain time. Thus, depending on an imaging timing, an image of the fertilized egg in a state where the blastomeres before and after cleavage are mixed as described above is possibly obtained. In this case, a result of a subsequent analysis processing may become inappropriate if the mixed blastomeres before cleavage and those after cleavage are handled without distinction. For example, if the blastomeres before and after cleavage are handled as equivalent in the case of evaluating the homogeneity of blastomeres, a size variation appears more notably than it should. Thus, a fertilized egg is possibly determined to be defective although the fertilized egg is in a good culture state.

From these, an image processing technique becomes necessary which can properly handle a three-dimensional image of a fertilized egg if the three-dimensional image is obtained for such a fertilized egg that blastomeres before cleavage and those after cleavage are mixed as just described. However, such a technique has not been established yet at present.

SUMMARY OF THE INVENTION

This invention was developed in view of the above problem and aims to provide an image processing technique enabling a subsequent analysis processing to be properly performed even if blastomeres before cleavage and those after cleavage are mixed in an image obtained through OCT imaging of a fertilized egg in an early development stage.

One aspect of this invention is directed to an image processing method. The image processing method comprises obtaining three-dimensional image data representing a three-dimensional image of a fertilized egg in a cleavage stage obtained by imaging the fertilized egg by optical coherence tomography, extracting a blastomere region corresponding to an individual blastomere in the three-dimensional image for each blastomere based on the three-dimensional image data, counting a number of the blastomere region extracted in the three-dimensional image obtaining a volume of each blastomere region based on the three-dimensional image data and determining a number X of the extracted blastomere regions is expressed by a following inequality:

$$2^N < X < 2^{N+1} \text{ (N is a natural number)}$$

and when the inequality holds, dividing each of ($2^{N+1}-X$) blastomere regions having a largest volume out of the X blastomere regions equally into two blastomere regions.

The blastomere immediately before cleavage is generally larger than the blastomeres immediately after cleavage and typically has twice the volume of each blastomere after cleavage. In view of this, in the invention, when the number of the extracted blastomeres does not follow a geometric progression (2, 4, 8, . . . ) with a first term of 1 and a common ratio of 2, the following processing is performed under the assumption that some blastomeres are before cleavage. Specifically, by regarding the blastomere having a large volume as equivalent to two blastomeres obtained by equally dividing the volume of that blastomere into two, an apparent blastomere number is rounded to a number following the above geometric progression. By doing so, it can be suppressed that a size variation of the blastomeres due to a deviation between an imaging timing and a cleavage timing affects a subsequent analysis processing. Thus, an evaluation on the quality of the fertilized egg based on an analysis result of an image can be properly made.

As described above, according to the invention, even if a three-dimensional image obtained by imaging a fertilized egg (embryo) in an early stage includes blastomeres immediately before cleavage, a subsequent quantitative analysis processing can be properly performed.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF DRAWINGS

FIG. 3 is a flow chart showing the image processing in this embodiment.

FIG. 4 is a chart showing the principle of the blastomere number adjustment processing.

FIGS. 5A and 5B are diagrams showing the blastomere number adjustment processing.

DETAILED DESCRIPTION OF THE PREFERRED EMBODIMENTS

Figure 1:
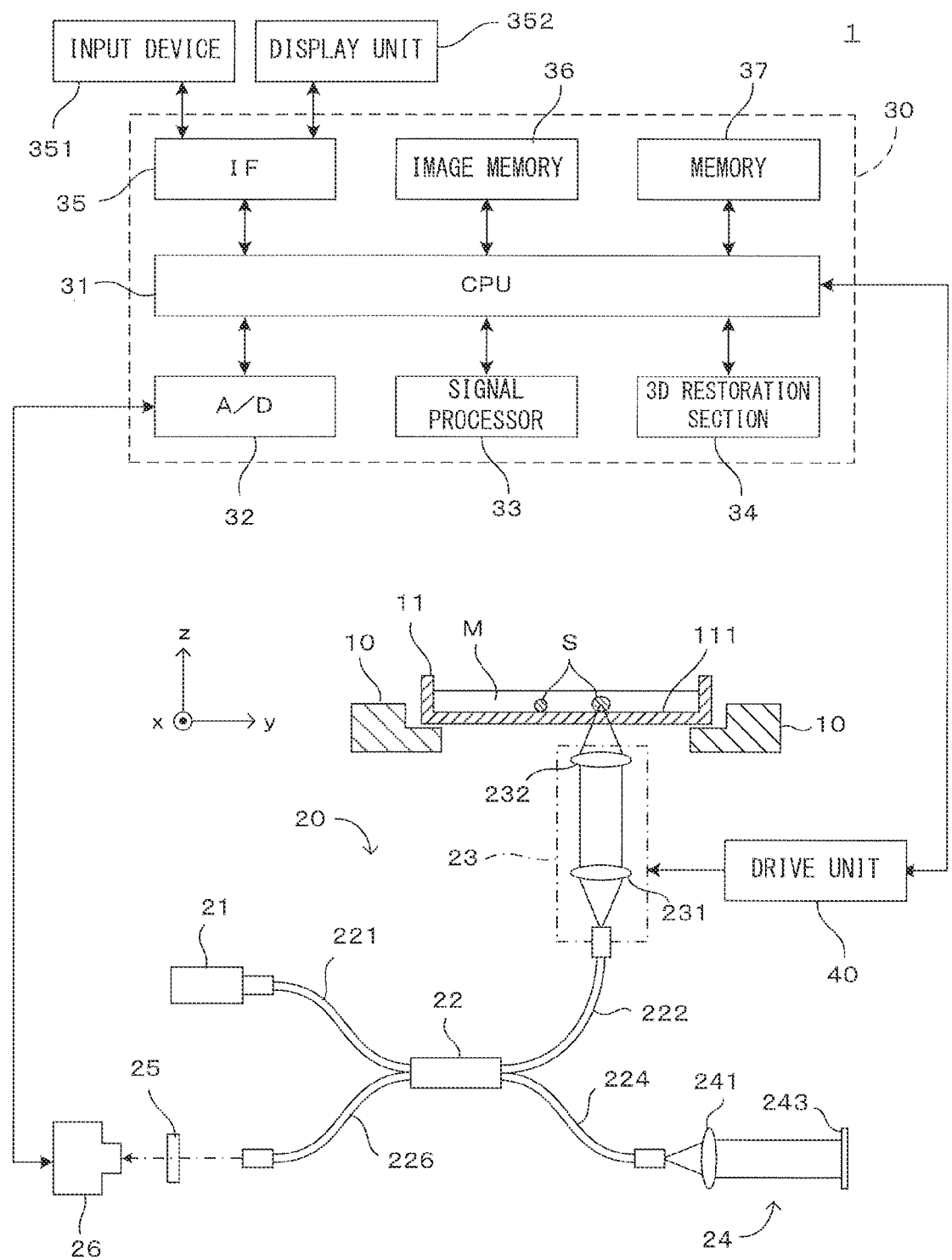
FIG. 1 is a diagram showing a schematic configuration of a preferred image processing apparatus as an execution subject of an image processing method according to the invention.

FIG. 1 is a diagram showing a schematic configuration of a preferred image processing apparatus as an execution subject of an image processing method according to the invention. This image processing apparatus 1 tomographically images a specimen carried in a liquid, e.g. a fertilized egg (embryo) cultured in a culture liquid. Then, the obtained tomographic image is processed to generate a cross-sectional image showing the structure of one cross-section of the specimen. Further, a three-dimensional image of the specimen is generated from a plurality of tomographic images. xyz orthogonal coordinate axes are set as shown in FIG. 1 to indicate directions in the drawings to comprehensively show directions in each figure. Here, an xy plane represents a horizontal plane. Further, the z axis represents a vertical axis and, more particularly, a (−z) direction represents a vertically downward direction.

The imaging apparatus 1 comprises a holder 10. The holder 10 holds in an approximately horizontal posture a container 11 storing a specimen S to be imaged. The container 11 is, for example, a shallow plate-like container having a flat bottom surface and called a "dish" in which a recess capable of supporting the liquid is formed on the upper surface of the plate-shaped member. A culture medium M such as culture liquid is poured in the container 11, and a fertilized egg as a specimen S is carried inside. In this example, the multiple samples S are carried in the dish as the container 11. However, the container is limited to this.

Although a plurality of specimens S are carried in the specimen container 11 having a single recess in this example, there is no limitation to this. For example, the specimen container 11 may be a well plate in which a plurality of recesses called wells are arranged in one plate-like member. In this case, the plurality of specimens S can be carried one by one in the plurality of wells. Further, for example, a plurality of dishes each carrying the specimen S may be held by the holder 10 while being arranged side by side in a horizontal direction, and subjected to imaging.

The imaging unit 20 is arranged below the container 11 held by the holder 10. An OCT (Optical Coherence tomography) device capable of capturing a tomographic image of an imaging object in a non-contact and non-destructive (non-invasive) manner is used as the imaging unit 20. As described in detail later, the imaging unit 20, which is an OCT device, includes a light source 21 for generating illumination light to the imaging object, an optical fiber coupler 22, an objective optical system 23, a reference optical system 24, a spectrometer 25 and a photodetector 26.

The image processing apparatus 1 further comprises a control unit 30 which controls an operation of the apparatus and a drive unit 40 which drives movable parts of the imaging unit 20. The control unit 3 includes a CPU (Central Processing Unit) 31, an A/D convertor 32, a signal processor 33, a 3D restoration section 34, an interface (I/F) section 35, an image memory 36 and a memory 37.

The CPU 31 governs operations of the entire apparatus by executing a predetermined control program, thereby realizes various processing described later. The control program executed by the CPU 301 and data which are generated during processing are stored in the memory 37. The A/D convertor 32 converts signals which the photo-detector 26 and the imaging element 282 of the imaging unit 20 output in accordance with the amount of received light into digital image data. The signal processor 33 performs image processing described later based upon a digital data outputted from the A/D converter 32, thereby generates the tomographic image of the imaging object. The 3D restoration section 34 has a function for generating a three-dimensional (3D) image of the imaging object based on the image data of a plurality of the tomographic image obtained by imaging. The image memory 36 saves the image data thus generated image data of the tomographic images and the 3D images.

The interface section 35 realizes communication between the image processing apparatus 1 and outside. More specifically, the interface section 35 has a function of communicating with external equipment, and a user interface function of accepting manipulation by a user and informing the user of various types of information. For achieving these objects, the interface section 35 comprises an input device 351 and a display section 352. The input device 351 includes, for instance a key board, a mouse, a touch panel or the like which can accept manipulation and entry concerning selection of the functions of the apparatus, setting of operating conditions, etc. Further, the display section 352 includes a liquid crystal display for example which shows various types of processing results such as the tomographic images generated by the signal processor 33 and the 3D images generated by the 3D restoration section.

In the imaging unit 20, from the light source 21 which includes a light emitting element such as a light emitting diode or a super luminescent diode (SLD) for instance, a low-coherence light beam containing wide-range wavelength components is emitted. For imaging the specimen such as cells or the like, an infrared light can be used favorably to make illumination light penetrate into the specimen.

The light source 21 is connected one optical fiber 221 of optical fibers constituting the optical fiber coupler 22. Low-coherence light emitted from the light source 21 is branched into lights to two optical fibers 222, 224 by the optical fiber coupler 22. The optical fiber 222 constitutes an object side optical path. More specifically, light emitted from an end part of the optical fiber 222 is incident on an objective optical system 23.

The objective optical system 23 includes a collimator lens 231 and an objective lens 232. Light emitted from an end part of the optical fiber 222 is incident on the objective lens 232 via the collimator lens 231. The objective lens 232 has a function of converging light (observation light) from the light source 21 to the specimen and a function of condensing reflected light from the specimen and causing the condensed reflected light toward the optical fiber coupler 22. Although a single objective lens 232 is shown in FIG. 1, a plurality of optical elements may be combined. Reflected light from the imaging object is incident as signal light on the optical fiber 222 via the objective lens 232 and the collimator lens 231. An optical axis of the objective lens 232 is orthogonal to the bottom surface of the container 11 and, in this example, an optical axis direction coincides with a vertical axis direction.

The drive unit 40 is administered by the CPU 31. Specifically, the CPU 31 sends a control command to the drive unit 40. In response to the control command, the drive unit 40 causes the imaging unit 20 to move to a predetermined direction. More specifically, the drive unit 40 makes the imaging unit 20 move in a horizontal direction (XY direction) and a vertical direction (Z direction). By a movement of the imaging unit 20 in the horizontal direction, the imaging field of view moves in the horizontal direction. Further, by a movement of the imaging unit 20 in the vertical direction, a focus position of the objective optical lens 232 along the optical axis direction changes relative to the specimen S as the imaging object.

Part of light incident on the optical fiber coupler 22 from the light source 21 is incident on the reference optical system 24 via an optical fiber 224. The reference optical system 24 includes a collimator lens 241 and a reference mirror 243. These constitute a reference system optical path together with the optical fiber 224. Specifically, light emitted from an end part of the optical fiber 224 is incident on the reference mirror 243 via the collimator lens 241. The light reflected by the reference mirror 243 is incident as reference light on the optical fiber 223.

The reflected light (signal light) reflected by a surface or an internal reflecting surface of the specimen and reference light reflected by the reference mirror 243 are mixed in the optical fiber coupler 22 and incident on the photo-detector 26 via the optical fiber 226. At this time, interference due to a phase difference between the reflected light and the reference light occurs, but an optical spectrum of interference light differs depending on a depth of the reflecting surface. That is, the optical spectrum of the interference light has information on a depth direction of the imaging object. Thus, a reflected light intensity distribution in the depth direction of the imaging object can be obtained by spectrally diffracting the interference light at each wavelength to detect a light quantity and Fourier transforming a detected interference signal. An OCT imaging technique based on such a principle is called Fourier domain OCT (FD-OCT).

The imaging unit 20 of this embodiment is provided with a spectroscope 25 on an optical path of the interference light from the optical fiber 226 to the photo-detector 26. A spectroscope utilizing a prism, a spectroscope utilizing a diffraction grating and the like can be, for example, used as the spectroscope 25. The interference light is spectrally diffracted for each wavelength component and received by the photo-detector 26.

By Fourier-transforming the interference signal output from the photo-detector 26 according to the interference light detected by the photo-detector 26, the reflected light intensity distribution of the specimen in the depth direction, i.e. in the z direction at the incident position of the illumination light is obtained. By scanning the illumination light incident on the container 11 in the x direction, the reflected light intensity distribution in a plane parallel to an xz plane is obtained, with the result that a tomographic image of the specimen having this plane as a cross-section can be generated. A principle of generation of the tomographic image is not described because it is known.

Images are obtained by changing the incident position of the light along the y direction over multiple steps and imaging a tomographic image for every change. By doing so, a number of tomographic images of the specimen are obtained along cross-sectional surfaces which are parallel to the xz plane. As the scan pitch in the y direction is reduced, it is possible to obtain image data with sufficient resolution to grasp the stereoscopic structure of the specimen. From these tomographic image data, 3D image data (voxel data) corresponding to a body of the specimen can be obtained. As just described, this image processing apparatus 1 has a function of obtaining an image of the specimen S carried together with the culture medium M in the container 11. Obtainable images include two-dimensional image data obtained by optical microscope imaging, tomographic image data obtained by OCT imaging and three-dimensional image data based on the tomographic image data.

In this embodiment, the image processing apparatus 1 configured as described above is used for the imaging and quantitative evaluation of a fertilized egg (embryo). Specifically, a fertilized egg in a cleavage stage is imaged by OCT and a three-dimensional image thereof is obtained. By analyzing this image by an image processing, an index value is calculated which indicates a size variation degree of blastomeres constituting the fertilized egg. Specific contents of this processing are described below.

Figure 2A:
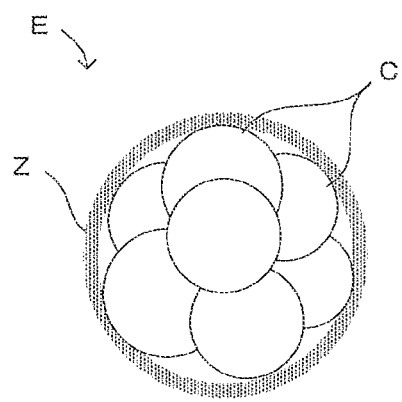
FIGS. 2A and 2B are views schematically showing a structure of a fertilized egg (embryo) serving as a specimen in this embodiment.
Figure 2B:
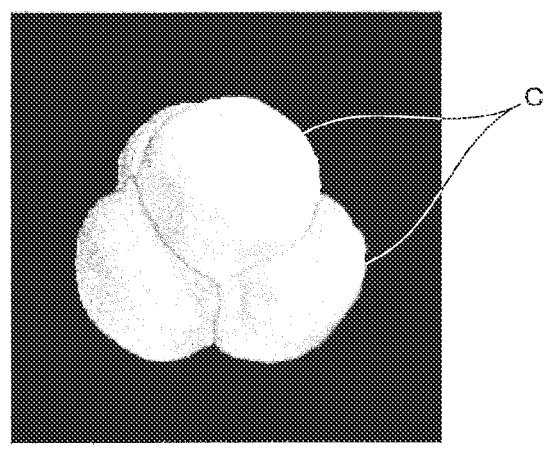

FIGS. 2A and 2B are views schematically showing a structure of a fertilized egg (embryo) serving as a specimen in this embodiment. As already known, if an egg is fertilized, cleavage starts and a blastocyst is formed through a state called a morula. An image processing method of this embodiment is suitable for the analysis and evaluation of a fertilized egg, for example, in a cleavage stage immediately after fertilization to a morula stage.

FIG. 2A schematically shows the structure of the fertilized egg in an early stage (e.g. from a 4-cell stage to the morula stage). The fertilized egg (embryo) has a substantially spherical outer shape. The surface of the fertilized egg is covered with a layer Z of jelly-like glycoprotein called a zona pellucida, and a plurality of cells C formed by the cell cleavage of the fertilized egg are included inside. The cells at this time are, in particular, also called "blastomeres".

Thus, the "blastomeres C" may be written instead of the "cells C" in the following description.

As cleavage progresses, the number of the blastomeres C increases. In a state where cleavage satisfactorily progresses, the inside of the zona pellucida Z is relatively large and occupied by a plurality of the blastomeres C having a uniform size. In other words, in the fertilized egg in the cleavage stage, whether or not the blastomeres C constituting this fertilized egg have a uniform size is one of indices for determining whether or not a culture state is good.

A size variation of the blastomeres is used as an index of the evaluation of the fertilized egg in this way also in Veeck's classification. However, as described above, the evaluation of a variation degree is left to the visual judgment of an observer. In this embodiment, an index value quantitatively indicating this variation degree is automatically calculated by analyzing an image obtained by OCT imaging.

Although described in detail later, for the above purpose, the image processing of this embodiment includes a processing of extracting regions occupied by the individual blastomeres C from a three-dimensional image of the fertilized egg E obtained by OCT imaging. A technique described, for example, in patent literature 1 can be suitably applied as the image processing for this. Patent literature 1 discloses a technique for dividing and extracting regions respectively corresponding to the zona pellucida Z, the blastomeres C and micro objects called fragments and further individually dividing the region corresponding to each blastomere C by applying an image processing to a three-dimensional image of a fertilized egg. A local thickness calculation and a watershed algorithm are used for region division.

FIG. 2B shows an example of blastomeres extracted from an OCT image. More specifically, this figure is obtained by applying the image processing method described in patent literature 1 to the OCT image of the fertilized egg in the cleavage stage. Here, the region corresponding to the zona pellucida extracted from the three-dimensional image of the fertilized egg is erased and the regions corresponding to the individual blastomeres C are represented by mutually different luminances. A plurality of the blastomeres C are integrated while being held in close contact with the other blastomeres. These can be divided by the image processing. This method can also be applied to the extraction of the blastomeres C in this embodiment. Accordingly, a blastomere extraction processing is not described in detail below.

FIG. 3 is a flow chart showing the image processing in this embodiment. This processing is realized by executing a predetermined control program by the CPU 31 of the control unit 30 and causing each component of the apparatus to perform a predetermined operation. First, three-dimensional image data corresponding to a three-dimensional image of a fertilized egg in a cleavage stage to be evaluated is obtained (Step S101). The image data may be obtained by newly performing OCT imaging with the fertilized egg as a specimen S. Further, image data obtained by past imaging may be read out from the image memory 36. Further, image data saved in an external storage device or the like may be obtained through an electrical communication line.

Blastomere regions corresponding to the respective blastomeres, out of the three-dimensional image of the fertilized egg, are extracted based on the three-dimensional image data of the fertilized egg obtained in this way (Step S102). More specifically, the three-dimensional image is divided into the regions respectively corresponding to the zona pellucida and the blastomeres (and fragments if necessary) by applying the image processing described in patent literature 1 to the three-dimensional image data. Region division is applied to the blastomeres cell by cell and the blastomere regions corresponding to the individual blastomeres are specified. By erasing objects other than those corresponding to the blastomere regions, the blastomere region corresponding to each blastomere is extracted.

If the regions corresponding to the individual blastomeres are specified in the three-dimensional image in this way, the number and volumes of the blastomeres are measured (Step S103). The number of the blastomeres obtained in this way is denoted by X below. The volume of each blastomere can be, for example, expressed by the number of voxels constituting the blastomere region. Further, the volume of the blastomere in an actual space can be obtained by multiplying a volume equivalent to one voxel in the actual space by the number of the voxels.

Here, it is determined whether or not the counted number X of the blastomeres is a number corresponding to a power of 2 (Step S104). If not (NO in Step S104), a blastomere number adjustment processing (Step S105) is subsequently performed. On the other hand, if the blastomere number X corresponds to a power of 2 (YES in Step S104), Step S105 is skipped. The blastomere number adjustment processing is a processing for suppressing an erroneous evaluation due to a timing variation of cell cleavage in the process of cleavage in a blastomere variation evaluation to be described later. Contents of this processing are described below.

Figure 4:
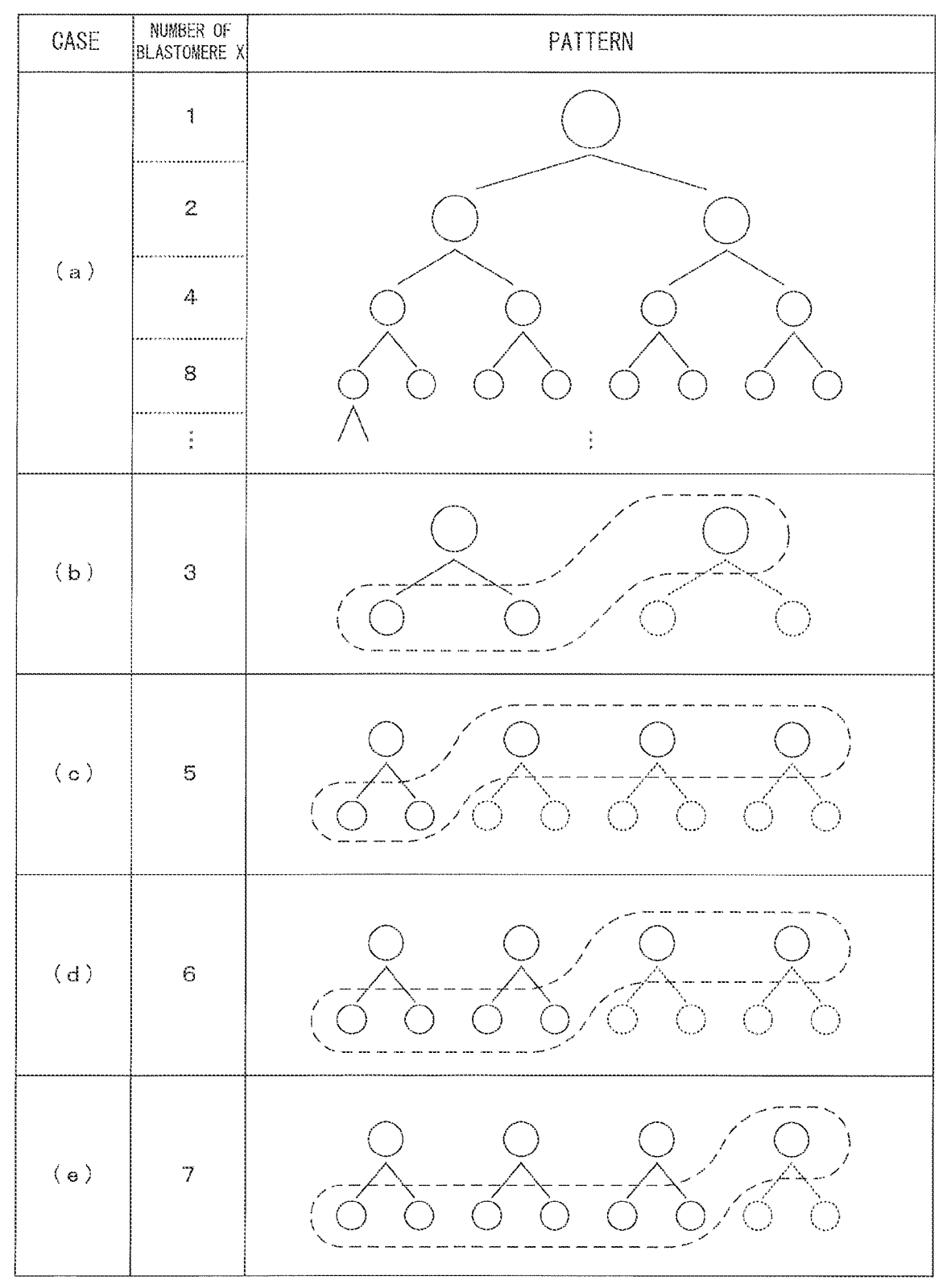

FIG. 4 is a chart showing the principle of the blastomere number adjustment processing. In column "Pattern" of FIG. 4, a circular symbol "○" represents one blastomere. As shown as a case (a) in FIG. 4, cleavage generally progresses by repeating a cycle of dividing one cell into two in each generation. Thus, the number of the blastomeres increases 1, 2, 4, . . . by two times in each generation. That is, the blastomere number X in each generation can be expressed by a geometric progression with a first term of 1 and a common ratio of 2.

However, the respective cells are not strictly simultaneously divided. Thus, the cells before cleavage and those after cleavage are possibly mixed in an image captured as a stationary image at a certain time. In this case, the blastomere number X may not follow the geometric progression described above. Also in this embodiment, the blastomere number X obtained in Step S103 does not possibly follow regularity expressed by the above geometric progress.

Even if the blastomere number deviates from the regularity as just described, it does not immediately indicate that the quality of the fertilized egg is problematic if it is caused by a relationship of a cell cleavage timing and an imaging timing. However, this possibly causes an erroneous evaluation, for example, if a state of the fertilized egg is evaluated based on a size variation of the blastomeres.

That is, if the respective blastomeres have a uniform size, i.e. the size variation is small, the fertilized egg is in a good state. Here, the blastomeres before cleavage are generally larger than those after cleavage. Thus, if the blastomeres before cleavage and those after cleavage are mixed as described above, a variation obtained between those is naturally large. However, since this variation is temporarily caused by a timing difference of cell cleavage, an evaluation result becomes inappropriate if this result is directly used in evaluation.

Accordingly, in this embodiment, if the blastomere number X obtained as a result of the region division deviates from the above regularity, it is assumed that the blastomeres before cleavage and those after cleavage are mixed. From the general knowledge that the blastomeres before cleavage are larger than those after cleavage, it is estimated that, out of the blastomeres, those having a large volume are the blastomeres before cleavage. If such blastomeres are divided into two, each divided blastomere has about half the size of the original blastomere.

Therefore, by equally dividing the volume of the original blastomere region into two, it is thought to be possible to express the size of each blastomere after cleavage in a pseudo manner. By dividing one blastomere region estimated to correspond to the blastomere before cleavage into two pseudo blastomere regions in this way, it becomes possible to make an evaluation, handling those as equivalent to the other blastomeres after cleavage, i.e. regarding those as cells of the same generation. The blastomere region generated by division does not necessarily represent the actual shape of the blastomere after cleavage. However, this region can be suitably utilized, for example, for the purpose of deriving quantitative information such as the size.

As described above, the blastomere number X obtained from one stationary image can take various values, depending on the imaging timing thereof. For example, as shown as a case (b) in FIG. 4, the blastomere number X is, possibly, 3 by being composed of two blastomeres after cleavage from the state of the blastomere number of 2 and one blastomere before cleavage as shown by an enclosing broken line in FIG. 4. A case (c) where the blastomere number X is 5 is possibly a case composed of two blastomeres after cleavage from the state of the blastomere number of 4 and three blastomeres before cleavage.

Similarly, a case (d) where the blastomere number X is 6 can be considered as a combination of four blastomeres obtained by the division of two blastomeres from the state of the blastomere number of 4 and two blastomeres before cleavage, and a case (e) where the blastomere number X is 7 can be likewise considered as a combination of six blastomeres obtained by the division of three blastomeres from the state of the blastomere number of 4 and one blastomere before cleavage. More generally, when the blastomere number X is expressed by the following inequality, using a natural number N:

$$2^N < X < 2^{N+1} \quad \text{(Formula 1)},$$

$(2^{N+1}-X)$ blastomeres are estimated as the blastomeres before cleavage.

Accordingly, each of $(2^{N+1}-X)$ blastomeres estimated as the blastomeres before cleavage is divided into two and an apparent blastomere number X is rounded to any one of numbers (4, 8, . . . ) in the geometric progression. By doing so, a risk of erroneous evaluation in the quantitative evaluation of the fertilized egg can be reduced. The processing for this is the blastomere number adjustment processing (Step S105).

Note that a case where the blastomere number does not follow the regularity of the geometric progression in this way is possibly other than the case where the blastomeres before and after cleavage are mixed as described above. For example, such a case occurs due to an abnormality in the cleavage process such as the inactivation of some of the blastomeres. In such a case, the blastomere number adjustment processing does not necessarily give a proper result. However, since a large variation appears also in an evaluation process of evaluating a blastomere variation to be described later in such a case, it is avoided that the fertilized egg is erroneously evaluated as a fertilized egg in a good state.

FIGS. 5A and 5B are diagrams showing the blastomere number adjustment processing. FIG. 5A is a flow chart showing processing contents of the blastomere number adjustment processing. When the number X of the extracted blastomeres cannot be expressed by $2^N$, $(2^{N+1}-X)$ blastomere regions having a large volume are selected based on the above principle (Step S201). These blastomere regions are estimated to correspond to the blastomeres before cleavage. Accordingly, these blastomere regions are equally divided into two. Various methods are considered as a method for equally dividing a blastomere region into two.

For example, there is a method for equally dividing a blastomere region into two by a plane orthogonal to a major axis of the blastomere region. Specifically, an axis corresponding to the major axis of each blastomere is specified (Step S202) and a plane of section for dividing the blastomere region is temporarily set (Step S203). The plane of section is a plane perpendicular to the major axis. A ratio of the volumes of two regions obtained by dividing the blastomere region by this plane of section is obtained (Step S204) and it is judged whether or not that value is within an allowable range (Step S205).

For the purpose of equally dividing one blastomere region into two, the volume ratio of the divided two blastomere regions is ideally 1:1. However, realistically, the two blastomere regions only have to be substantially equal. A range having a certain width from 1:1 as a basis may be, for example, set as the allowable range and it may be determined whether or not the volume ratio is within this allowable range.

If the volume ratio is within the allowable range (YES in Step S205), a region division result by the plane of section set at that time can be adopted. On the other hand, if the volume ratio is outside the allowable range (NO in Step S205), the setting of the plane of section is redone and Steps S203 to S205 are repeated until the volume ratio falls within the allowable range. In this way, one blastomere region can be divided into two blastomere regions having a substantially equal volume. The above division is performed for all the blastomere regions selected in Step S201. In this way, the blastomere number X after dividing can be expressed by $2^N$ using the natural number N.

FIG. 5B is a table showing a relationship of the blastomere number X obtained in Step S103 and the number $(2^{N+1}-X)$ of the blastomeres to be divided at that time. For example, if the blastomere number X obtained in Step S103 is 3, the final blastomere number becomes 4 by dividing one blastomere having a largest volume into two. Further, when the blastomere number X is 5, each of three blastomeres having a large volume is divided into two and the final blastomere number becomes 8. A similar way of thinking can be applied to an arbitrary case where the blastomere number X is 6 or more. As just described, the final blastomere number can be rounded to $2^N$ by dividing some of the blastomeres according to the value of the blastomere number X. In this way, it can be avoided that a size variation due to a timing deviation of cell cleavage and imaging causes an erroneous evaluation.

Figure 6A:
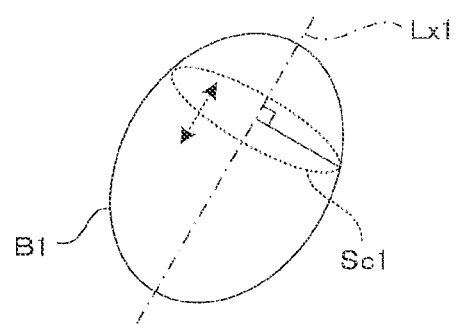
FIGS. 6A and 6B are views showing an example of the method for dividing a blastomere into two.
Figure 6B:
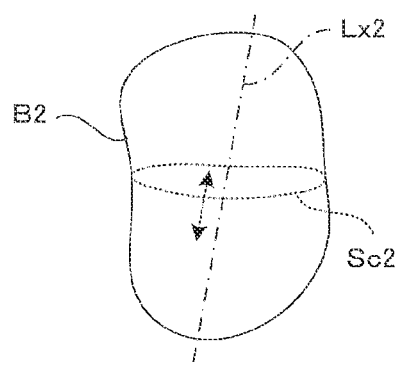

FIGS. 6A and 6B are views showing an example of the method for dividing a blastomere into two. In the above method, a plane of section Sc1 orthogonal to a major axis Lx1 is temporarily set for a blastomere B1 selected in Step S201 as shown in FIG. 6A. Then, the plane of section Sc1 is moved along the major axis Lx1 so that two regions divided by this plane of section Sc1 have a substantially equal volume. By doing so, the blastomere region B1 can be divided into two regions having a substantially equal volume.

Besides the above method, a method shown in FIG. 6B is, for example, considered. In this method, a further region division processing, e.g. a division processing using a watershed algorithm, is performed for a blastomere B2 having an indefinite shape. By doing so, the blastomere region B2 can be divided into two regions based on that shape. However, from the purpose of this embodiment for quantitatively expressing a size variation of blastomeres, more focus is given to making the volumes after dividing substantially equal than to division based on the shape. Accordingly, even in this case, if a major axis Lx2 is set for the blastomere region B2 and the volumes of the divided two regions largely differ, a plane of section Sc2 obtained by the watershed algorithm is moved along the major axis Lx2 if necessary. By doing so, a volume ratio of the two regions can be approximated to 1:1.

Referring back to FIG. 3, the image processing in this embodiment is further described. As described above, by adjusting the blastomere number if necessary, the blastomere before cleavage is handled as already divided two blastomeres in Step S106. The blastomere number X at this time is a numerical value expressed by $2^N$. An index value quantitatively expressing a variation of sizes, specifically of volumes, is obtained among these blastomeres (Step S106).

As described above, that the blastomeres have a uniform size indicates a good state in a fertilized egg in a cleavage stage. Thus far, an evaluator, who is a trained user of the apparatus, has visually evaluated a variation degree of the sizes of the blastomeres. Therefore, if an index value quantitatively indicating a variation degree of the sizes of the blastomeres is automatically calculated and presented, a workload of the evaluator is expected to be largely reduced.

Accordingly, a use mode of the obtained index value is, for example, thought to be such that the index value is presented to a user by being displayed and output on the display unit 352 (Step S107), thereby supporting a fertilized egg evaluation operation by the user. Further, as described later, a use mode of comparing the obtained index value with an appropriate threshold value and automatically determining whether or not a state of a fertilized egg is good is also considered.

A method for statistically processing volume values and quantitatively expressing the volume values, for example, by variance values is considered as a method for quantifying a volume variation obtained for the individual blastomere regions. Such a method may be applied, but it is also possible to quantify a variation, for example, by the following method if the sample number (the number of the blastomeres) is small as in this example.

Figure 7:
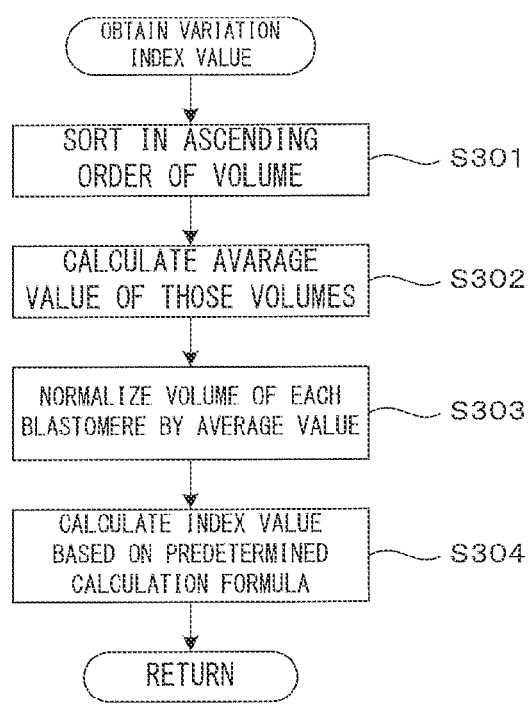
FIG. 7 is a flow chart showing a processing of obtaining a variation index value in this embodiment.

FIG. 7 is a flow chart showing a processing of obtaining a variation index value in this embodiment. The volume values of the respective X ($=2^N$) blastomeres extracted by the processing up to Step S105 (FIG. 3) are sorted, for example, in an ascending order based on the sizes thereof (Step S301). Further, an average value of those volumes is calculated (Step S302). Then, the volume of each blastomere is normalized by the obtained volume average value (Step S303). By applying the normalized volume value to a predetermined calculation formula, an index value quantitatively indicating a volume variation of the blastomeres is calculated (Step S304).

The index value may be such that a numerical value increases as the volume variation among the blastomeres increases, and various calculation formulae are considered. From the perspective that a user easily intuitively grasps a variation degree, the index value is desirably 0 or 1, for example, when there is no variation and increases as the variation increases. Three calculations methods are proposed as specific examples of a calculation method for such an index value.

Figure 8A:
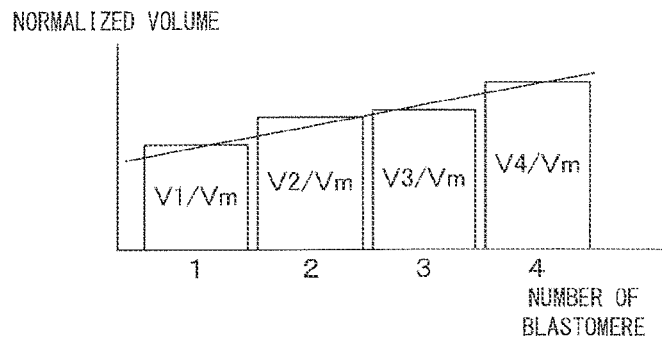
FIGS. 8A to 8C are graphs showing three examples of the index value calculation method.
Figure 8B:
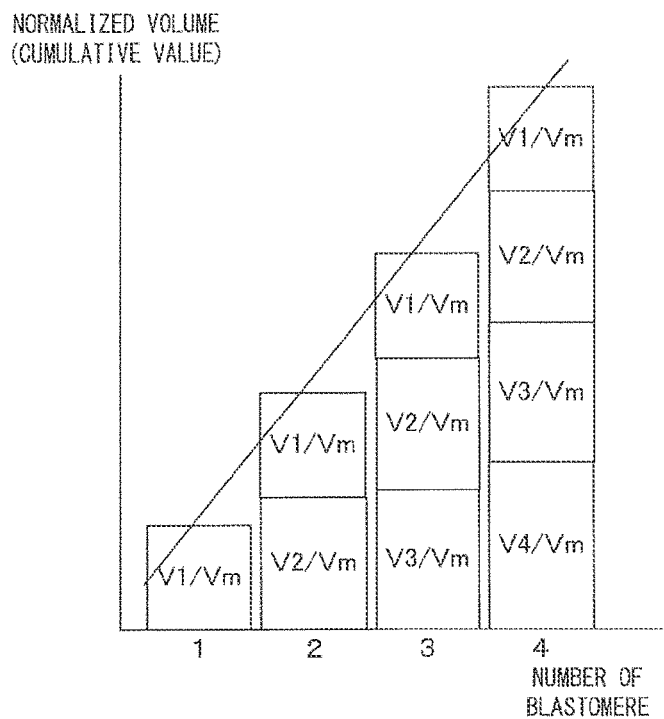
Figure 8C:
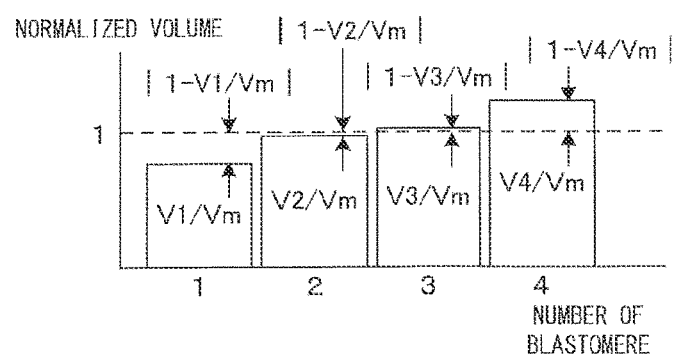

FIGS. 8A to 8C are graphs showing three examples of the index value calculation method. Here, a case where the blastomere number X after the blastomere number adjustment processing is 4 is taken as an easy example for facilitating understanding. Further, in the following description, the respective blastomeres when the volumes of the respective four blastomeres are sorted in an ascending order are distinguished by 1, 2, 3 and 4 and the respective volumes are denoted by V1, V2, V3 and V4. Further, a volume average value of these is denoted by Vm. In each figure, the volume of each blastomere is expressed as a normalized volume value after normalization using the volume average value Vm.

In the first example shown in FIG. 8A, a volume increase rate in relation to the number of the blastomere, i.e. a gradient of a straight line drawn in FIG. 8A, when the respective blastomeres are arranged in an ascending order of the volume is set as the index value. For example, an index value Vi can be expressed by the following formula, using a minimum value (V1/Vm) and a maximum value (V4/Vm) of the normalized volumes:

$$Vi=(V4/Vm-V1/Vm)/(4-1) \qquad \text{(Formula 2).}$$

When there is no volume variation among the blastomeres at all, the volumes V1, V4 are equal. Thus, the index value Vi expressed by (Formula 2) is zero. On the other hand, as the variation increases, a difference between the volumes V1 and V4 increases and the index value Vi expressed by (Formula 2) also increases. Note that, if (Formula 2) is more generalized, the following formula holds for the blastomere number X:

$$Vi=(Vx/Vm-V1/Vm)/(X-1) \qquad \text{(Formula 3).}$$

Here, the normalization of the volume of each blastomere using the volume average value means the elimination of the influence of the size of each blastomere due to the progress of the cleavage or due to an individual difference of the fertilized egg. For example, as the cleavage progresses, each blastomere becomes smaller. Thus, the use of the normalized volume is effective to prevent the variation index value from being affected by an absolute value of the volume. Note that although the volumes V1 to Vx of the respective blastomeres are substituted into the calculation formula after being normalized here, a technical significance remains unchanged even if the original volumes V1 to Vx are directly substituted into the calculation formula and the calculated values are normalized using the volume average value Vm. These points also applied to the following two examples.

In the second example shown in FIG. 8B, the index value Vi is obtained based on a cumulative value of the normalized volumes of the respective blastomeres. Specifically, a cumulative value of the volumes of two blastomeres 1, 2 having a small volume is plotted for the blastomere of number 2. Similarly, a cumulative value of the volumes of three blastomeres 1 to 3 is plotted in an ascending order of the volume for the blastomere of number 3. Further, a cumulative value of the volumes of all the blastomeres is plotted for the largest blastomere 4. A gradient of a straight line in a graph produced in this way is set as the index value Vi. If being generalized, the index value Vi can be expressed by the following equation:

$$Vi = \frac{\sum_{n=1}^{X} Vn/Vm - V1/Vm}{X - 1}. \quad \text{(Formula 4)}$$

In the third example shown in FIG. 8C, the index value Vi is obtained based on a fluctuation rate from an average value of normalized volumes of the respective blastomeres. Specifically, a difference between the normalized volume value and the normalized volume average value (i.e. 1) is obtained for each blastomere. A value obtained by dividing the sum of absolute values of those differences by a total blastomere number is set as the index value Vi. If being generalized, the index value Vi is expressed by the following equation:

$$Vi = \frac{\sum_{n=1}^{X} |1 - Vn/Vm|}{X}. \quad \text{(Formula 5)}$$

Such an index value Vi that is minimized when there is no volume variation among the blastomeres and increases as the variation increases can be defined by any of these calculation methods. That is, a size variation among the blastomeres can be quantitatively expressed by the magnitude of the index value Vi. Note that normalization using a median, a minimum value, a maximum value or the like of the volumes is also considered instead of normalization using the average value of the volumes. Particularly, if the volume of one blastomere is drastically larger (or smaller) than those of the other blastomeres, the average value is possibly largely biased by being affected by that. This problem can be avoided, for example, using a median.

The index value Vi obtained in this way can be referred to when the user judges the state of the fertilized egg. Further, as described next, the state of the fertilized egg can be automatically determined from the index value.

Figure 9:
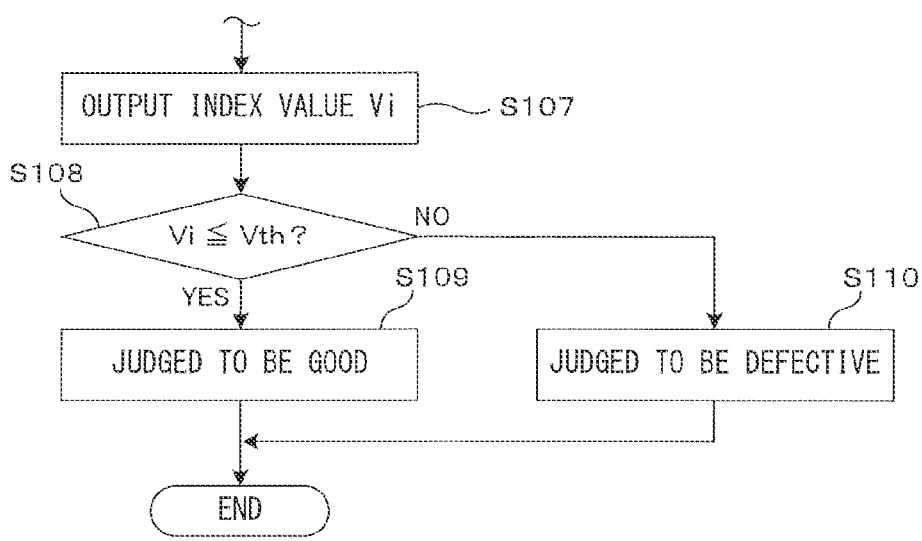
FIG. 9 is a flow chart showing an example of a fertilized egg evaluation method based on an index value.

FIG. 9 is a flow chart showing an example of a fertilized egg evaluation method based on an index value. This evaluation method can be realized by adding several processing steps after the image processing shown in FIG. 3. Thus, Steps S101 to S106 for which similar processings can be adopted are neither shown nor described. As in the above processing, the calculated index value Vi is displayed and output in Step S107. Then, the index value Vi and a threshold value Vth set in advance for the index value are compared (Step S108). If the index value Vi is equal to or less than the threshold value Vth (YES in Step S108), the state of the fertilized egg is judged to be good (Step S109) since the volume variation of the blastomeres is relatively small. On the other hand, if the index value Vi exceeds the threshold value (NO in Step S108), the volume variation of the blastomeres is large and the state of the fertilized egg is judged to be defective (Step S110).

As just described, it is, in principle, possible to automatically judge whether or not the fertilized egg is good from the obtained index value Vi. However, sufficient knowledge is not available as to how the threshold value is set for the index value. Thus, it is thought to be difficult at this point of time to definitely make an automatic judgment only based on the calculation result. Therefore, even if a judgment result is shown as reference information, a final judgment can be left to the user by presenting the index value Vi itself to the user.

As described above, in the image processing method of this embodiment, the blastomere regions occupied by the individual blastomeres are specified from the three-dimensional image of the fertilized egg in the cleavage stage obtained by OCT imaging, and the number and volumes of those blastomere regions are measured. Then, the index value quantitatively indicating the volume variation among the blastomeres is calculated by the predetermined calculation formula. This index value can effectively support a fertilized egg evaluation operation by the user and can be important quantitative information also in automating the evaluation operation.

Further, if the number of the blastomeres does not follow the regularity expressed by a power of 2, the blastomere number is adjusted by equally dividing some blastomeres having a large volume, out of those blastomeres, into two. In this way, quantitative information useful for the evaluation of the fertilized egg can be provided by eliminating the influence of a temporary large variation among the blastomeres, which is caused by a timing variation of the cell cleavage.

According to this embodiment, a size variation of the blastomeres, which is one of evaluation indices, is quantitatively shown, for example, when the user performs the fertilized egg evaluation operation based on Veeck's classification. In this way, the operation of the user can be effectively supported. For example, if there are a plurality of fertilized eggs, states of the fertilized eggs can be easily compared by quantitatively showing variation degrees of blastomeres in those fertilized eggs by a unified scale.

Note that the invention is not limited to the above embodiment and various changes other than the aforementioned ones can be made without departing from the gist of the invention. For example, the image processing apparatus 1 of the above embodiment has the function of performing the OCT imaging of the specimen S and the function of executing the image processing based on the image data. However, the development stage determination method of the invention can be also executed by a computer device having acquired imaging data obtained by imaging in another device having the imaging function without having the imaging function itself. To enable this, the invention may be carried out as a software program for causing the computer device to perform the respective processing steps of FIG. 3.

Such a program can be delivered, for example, by downloading via an electric communication line such as the Internet. This program can also be delivered in the form of a computer-readable recording medium non-transitorily storing the program. Further, by causing an existing imaging device having the OCT imaging function to read this program via an interface, the invention can be carried out by this apparatus.

Further, in the above embodiment, the technique described in patent literature 1 is utilized in extracting the blastomere regions from the three-dimensional image of the fertilized egg. However, another method may be used without limitation to the above method if this method can properly divide the individual blastomeres constituting the fertilized egg.

As the specific embodiment has been illustrated and described above, the watershed algorithm can be suitably applied to the extraction of the blastomere regions in the image processing method according to the invention. The respective blastomeres are held in close contact with each other while keeping the individual shapes to a certain extent in the fertilized egg, particularly in the fertilized egg in the cleavage stage. Thus, it is not easy to specify boundaries between those blastomeres in OCT imaging. For dividing the fertilized egg into a plurality of regions, the watershed algorithm using the unevenness of an object surface as a key, is very useful as the region division processing for such a fertilized egg.

Further, the blastomere region division method may be, for example, realized by equally dividing the blastomere region to be divided by a plane intersecting the major axis of that blastomere region. It is thought to be, in fact, impossible to estimate the shapes of the blastomeres after cleavage from the shape of the blastomere before cleavage. However, such a division method is considered to be reasonable from general knowledge that a cell immediately before cleavage is long and divided into two along a major axis direction thereof.

Further, for example, a step of obtaining an index value indicating a volume variation of the blastomeres based on the volume of each blastomere region after the division step may be further provided. According to the above invention, since the blastomere before cleavage is divided into assumed two blastomeres after cleavage, these can be handled as equivalent to the other blastomeres showing the states after cleavage. Thus, the invention can be suitably utilized, for example, for the purpose of evaluating a volume variation among blastomeres. The blastomeres having a uniform size in the fertilized egg in the cleavage stage is assumed to indicate that the state of the fertilized egg is good. By indicating the size variation by the quantitative index value, the evaluation operation of the state of such a fertilized egg can be effectively supported.

This invention is suitable for supporting observation and evaluation operations of a fertilized egg (embryo) in a cleavage stage. For example, the invention can be utilized for the purpose of supporting an operation of evaluating a state of a cultured embryo and selecting a fertilized egg having a higher pregnancy success rate in assisted reproductive technology.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image processing method, comprising:
    obtaining three-dimensional image data representing a three-dimensional image of a fertilized egg in a cleavage stage obtained by imaging the fertilized egg by optical coherence tomography, the three-dimensional image data being expressed as voxel data;
    extracting a blastomere region corresponding to an individual blastomere in the three-dimensional image for each blastomere by image processing for individually dividing the blastomere regions integrated in close contact with each other in the fertilized egg based on the three-dimensional image data;
    counting a number of the blastomere region extracted in the three-dimensional image;
    obtaining a volume of each blastomere region based on the three-dimensional image data; and
    determining a number X of the extracted blastomere regions is expressed by a following inequality:

$$2^N < X < 2^{N+1} \text{ (N is a natural number)}$$

and when the inequality holds, dividing each of $(2^{N+1}-X)$ blastomere regions having a largest volume out of the X blastomere regions equally into two blastomere regions.

2. The image processing method according to claim 1, wherein for extracting the blastomere regions, a watershed algorithm is applied.

3. The image processing method according to claim 1, the dividing of the blastomere region division is realized by equally dividing the blastomere region by a plane intersecting the major axis of the blastomere region.

4. The image processing method according to claim 1, further comprising obtaining an index value indicating a volume variation of the blastomeres based on the volume of each blastomere region, wherein
    when the dividing is executed, the index value is obtained by using volumes of the blastomere regions after the dividing.

5. A computer-readable recording medium, storing non-transitorily a computer program for causing a computer device to perform each processing of the image processing method according to claim 1.

* * * * *